United States Patent
Doemling et al.

(10) Patent No.: US 7,359,952 B2
(45) Date of Patent: Apr. 15, 2008

(54) CONTENT DELIVERY FREQUENCY CAPPING METHOD

(75) Inventors: Marcus F. Doemling, Lake Hiawatha, NJ (US); Peter J. Matsuo, Albany, NY (US)

(73) Assignee: Yahoo! Inc., Sunnyvale, CA (US)

( * ) Notice: Subject to any disclaimer, the term of this patent is extended or adjusted under 35 U.S.C. 154(b) by 913 days.

(21) Appl. No.: 10/647,832

(22) Filed: Aug. 25, 2003

(65) Prior Publication Data

US 2004/0088363 A1    May 6, 2004

Related U.S. Application Data

(60) Provisional application No. 60/405,786, filed on Aug. 23, 2002.

(51) Int. Cl.
*G06F 15/16* (2006.01)
(52) U.S. Cl. ........................................ 709/217; 709/203
(58) Field of Classification Search ................ 709/203, 709/217
See application file for complete search history.

(56) References Cited

U.S. PATENT DOCUMENTS

| 5,937,392 | A | * | 8/1999 | Alberts ........................ 705/14 |
| 5,948,061 | A | * | 9/1999 | Merriman et al. .......... 709/219 |
| 6,026,368 | A | * | 2/2000 | Brown et al. ................. 705/14 |
| 6,317,761 | B1 | * | 11/2001 | Landsman et al. .......... 715/513 |
| 2006/0089969 | A1 | * | 4/2006 | Brown et al. ............... 709/203 |

* cited by examiner

*Primary Examiner*—Jason Cardone
*Assistant Examiner*—Chirag R Patel
(74) *Attorney, Agent, or Firm*—Nathan O. Greene; Brinks Hofer Gilson & Lione

(57) ABSTRACT

A method for limiting the delivery of content, particularly advertisements intended to be displayed in a communications network environment, to individual recipients based on frequency considerations, including a method for storing statistical data relevant to making a determination about the limiting of content delivery and a method for providing alternate content in case it is decided that the original content should not be delivered to a recipient.

34 Claims, No Drawings

CONTENT DELIVERY FREQUENCY CAPPING METHOD

REFERENCE TO PRIOR APPLICATION

The current application claims priority to provisional application Ser. No. 60/405,786 filed on Aug. 23, 2002.

BACKGROUND

The present invention relates to the limiting of content delivery to individual recipients, particularly regarding the delivery of content over a communications network environment such as the world wide web. The delivered content may consist of any type of data format, or collection of formats that is typically used on the world wide web. Content comes in many forms, including text, graphics, audio, video, multimedia, etc. In particular, content used as online advertising is of interest. Generally, an online advertisement is displayed to an individual, i.e. a consumer, while the individual views material or uses functionality provided by a publisher on a communications network environment. A specific online advertisement is often displayed multiple times to a particular user. The present invention allows limiting the number of times a particular ad is seen by a user, also called the frequency capping. This frequency capping is independent of the location, web address, domain name or publisher, which is displaying the online ad. Frequency capping is achieved across publishers either per ad or per ad campaign if multiple ads are grouped into a campaign.

The proliferation of the Internet and world wide web (hereinafter "web") has created a great demand for effective content. After all, content is the key element that drives people to a website. Content comes in many forms, including text, graphics, audio, video, multimedia, etc. Numerous applications exist where content is being served over the web to clients.

In the web environment, content is typically embedded "indirectly" in web pages downloaded from a host server to a client (hereinafter "browser"). In particular, the web page will generally include references to content using uniform resource locators (URL) that tell the browser where to retrieve the content. The browser, upon analyzing the web page, will send a request out to the identified location, and the content will be returned and inserted in the web page at a predetermined location. During the requesting of this content the browser can send a message along to the server, which contains data that was previously sent to the browser from that server. This message is called a "cookie" and all major and most minor browser implementations support this cookie mechanism. This cookie mechanism is a useful tool in the process of accumulating statistical data about the delivered content.

Often, the content will reside on a third-party content server. For advertising content it is in many cases much more efficient to store content on a $3^{rd}$ party content server, particularly because in this case the $3^{rd}$ party content server (hereinafter "ad server") can accumulate statistics on the delivered ad independently of the web site publisher (hereinafter "publisher") and across multiple publishers. These statistics typically include the number of times the ad was delivered, called impressions, and the number of times the ad was acted upon, e.g. how many times the ad was "clicked". Depending on the format of the ad many other types of statistics can be accumulated by the ad server. A "publisher" may be an individual entity that publishes a web site, an entity that publishes content that is used within multiple web sites, such as ad networks, or any other entity that has authority over content published within web sites.

Current research strongly suggests that the effectiveness of an online ad is related to the number of times a particular user is exposed to the ad, also called the frequency of the ad. While it is usually desirable to show an ad more than once to a particular user it is also desirable to limit the number of times the user can see the ad. In other words it is desirable to apply frequency capping to an ad. Currently some publishers offer advertisers the ability to frequency cap ads shown on their web site, but this ability is limited to only that web site and cannot be applied to other publishers, which may also show the ad. While each publisher may frequency cap the ad the overall result regarding the frequency capping of the ad across multiple publishers will be poor if the publishers have an overlap in their visitor base.

Since an ad server already delivers ads across publishers and accumulates statistics, the present invention extends its functionality to offer frequency capping across publishers per ad or per ad campaign or per any other criteria, which could be used to decide on limiting the content delivery. A method that implements this frequency capping must solve several problems that would arise. First a mechanism is required to determine if a particular ad should be shown to a particular user, and secondly there must be a solution for what action to take if it is determined an ad should not show. In many cases simply not showing the ad is not an option and alternate content is required. While there are methods in place that allow an ad server to display alternate content, there is currently no method that allows the publisher to determine what that alternate content should be.

SUMMARY OF THE INVENTION

The present invention addresses the above mentioned need to limit content delivery by providing a method for limiting the content delivery to individual recipients, comprising: (1) a method for recording statistical data regarding particular content that has been delivered to an individual recipient; (2) a method for making and executing a frequency capping decision, and (3) a method for delivering alternate content in case a recipient should not receive the original content.

DESCRIPTION

I. Method to Record Statistical Data

In order to limit the number of times a particular content is delivered to an individual recipient it must be recorded how many times that content was received by that recipient. Other or similar data for making a determination on the limiting of content delivery can be recorded in place of or in addition to that content. The relevant information can either be stored by the recipient, or the ad server can store it. In a preferred embodiment the "cookie" mechanism can be used to store information on the recipient browser. The "cookie" mechanism, mentioned earlier, allows a content server to send data back to the browser together with content that it delivered. The browser will store that data and return it to the server on subsequent requests for content.

These "cookies" can be used to either store the statistical data directly in the recipient's browser, or it can be used to store a unique identifier, which is used on the ad server to associate that browser with data stored on the ad server. When a browser requests content from the ad server the very first time it will not have any "cookie" data yet to send along with the request. The ad server can then, after detecting the lack of "cookie" data, send back either a unique identifier or the statistical data, such as the information that the requested content was requested one time. On subsequent requests for that content either the unique identifier sent with the request as "cookie" data is used to retrieve the statistical data stored on the server for that browser, or updated "cookie" data is returned such as an incremented impression count for that content. Note that in the "cookie" mechanism the data is sent back to the server that sent the data earlier along with content independent of the publisher that refers to that content within a web page. Therefore, the "cookie" mechanism is independent of publisher or domain name boundaries.

Also note that the ad server may not only track impressions of particular individual content, but also may track the impressions of a particular group of content, called a campaign. As an example, the $2^{nd}$ impression of content (X) for a particular visitor may be that visitor's $5^{th}$ impression of the campaign (Y) to which content (X) belongs. This allows limiting content delivery not only by particular content, but also by campaigns. In addition, there are many other methods, systems, definitions or algorithms that could be applied to a set of content for the purpose of deciding whether or not content should be delivered to an individual recipient. Also the recipients may be grouped by any criteria. In the spirit of this invention any mechanism or information for making the decision on whether or not to limit the content delivery may be used.

There may be other methods for storing the data used for determining if content delivery should be limited. In the present invention any other method that can be used to access this information either on the server or on the recipients browser may be able to substitute the method described herein.

II. Method (A) for Delivering Alternate Content.

If it is determined that a particular content should not be delivered anymore to a particular recipient, alternate content is most likely required to fill the advertising void created. The present invention desires to offer the limiting of content delivery as a $3^{rd}$ party service with the least possible required cooperation by a web site publisher. Therefore, this determination about which content to deliver—the original or the alternate one—should be made by the $3^{rd}$ party service. In addition, while this determination may be possible by the web site publisher with respect to impressions served by that publisher, the publisher would not be able to determine how many times the content was delivered by other publishers.

With the method described here a web site publisher would refer to the content within the web site. When that content is requested by the visitor's browser the browser will send "cookie" data along to the ad server in case that browser had received the content before and the ad server was able to set "cookie" data at that time. The server can then use the received "cookie" data to make the decision to either return the requested content or to take action that will cause alternate content to be used in place of the original requested content.

What the alternate content should be can in most cases not be known by the ad server. The web site publisher would most likely desire to provide alternate content. Also the publisher would want the ability to determine dynamically at the time it is needed what the alternate content should be. Therefore, a mechanism is required that allows the publisher to specify the alternate content. This can be achieved by using programming code that is executed by a visitor's browser. Instead of delivering content, directly, programming code is delivered that when executed on a visitor's browser will load and embed content into the web page. When a publisher refers to the ad server content within a web page it also adds programming code that defines the location of "alternate programming code". This could be achieved by setting a specific programming variable to the location (URL) of the alternate programming code. The ad server has the option of delivering two types of programming code. For the first case, the programming code loads and embeds the original content when executed on a visitor's browser. In the second case, the programming code loads and executes the alternate programming code specified in the programming variable defined by the publisher.

To illustrate this mechanism consider the following example. The example uses the common browser language Javascript, which is used in virtually all browser software in use today.

EXAMPLE 1

The publisher uses the following code inside a web page:
<SCRIPT>var alt_content="http://example-publisher.com/alt_content.js" </SCRIPT>
<SCRIPT SRC="http://ad-server-example.com/content.js"></SCRIPT>

When the browser requests the javascript file from the ad server, "cookie" data is sent along with that request. Using this data the server can decide to return one of 2 possible responses:
Response 1 (use original content):
document.write('<IMG SRC="http://ad-server-example.com/image.gif" >');
Response 2 (use alternate content):
document.write('<SCRIPT SRC="'+alt_content+'"></SCR'+'IPT>');

Using programming code as alternate content provides the greatest flexibility to the publisher to define alternate content. But as a variation to this method it would also be possible to use other forms of alternate content. As an example the location of the alternate content could point to another web page that would be embedded into the current web page by using an IFRAME or other mechanism available in browsers. Or instead of defining a URL for alternate content the programming variable could contain the HTML code that comprises the alternate ad directly. Also note that the response from the ad server may contain the response content directly or may instruct the browser to request the content from a different location. Therefore instead of returning different response content the ad server may redirect the browser to different locations where different response content is located. This can be used to redirect the browser back to a predefined location within the publisher's authority, such that the publisher is able to deliver the alternate content.

III. Method (B) for Delivering Alternate Content

In method (A) the content was embedded into a web page using programming code that is executed on the visitor's browser. Using this approach of using client-side programming it is also possible to make the determination of whether to choose original or alternate content on the client-side in the visitor's browser instead of doing that on the server side. Making the decision on the client side may be desirable in those cases where the content is not served directly by the ad server but instead by another entity. In that case that other entity may not be able to make a decision on the server side when a request for content is received, either because it does not have access to the statistical data used for making the determination about what content to show, or because the server of the other entity is not capable of dynamically evaluating response choices in accordance with the ad server.

Using client-side programming it is possible to access "cookie" data from within the browser. However the cookie data that is available is associated with the publisher's domain, not with the domain of the ad server. For client-side programming the domain of the embedding web page is relevant, not the domain of the server that delivered the embedded programming code. In other words, the "cookie" data set by the ad server is not available in client-side programming. Therefore, if it is on the client side where the frequency capping should be decided, the data relevant for that decision must be retrieved from the ad server. There are several options for retrieving that data.

It is possible to load content from the ad server that will either contain the relevant data for making the decision or the decision may already be contained in the data. One possibility is to embed another programming code, which is retrieved from the ad server. When the request for, that programming code is received the ad server can access "cookie" data and return that data, back to the client in form of programming code, for example by setting programming variables. Or the "cookie" data can be used to make a decision and return that decision also by setting a programming variable to a particular value. Also, the programming code may call different programming functions defined in the embedding code or call functions with different parameters to define data or convey a decision. In addition, the content loaded from the ad server can be an object with properties that are available to the client programming code, such that these object properties can be used to convey a message from the ad server to the client programming code. An example of this would be an image object with specific dimensions, such that a short message is encoded into the dimensions dynamically by the ad server.

As a variation to this method the client-side programming code could store the information retrieved from the ad server as publisher "cookie" data. While the client side programming code cannot access the ad server "cookie" data it can access publisher "cookie" data. If the data is stored as publisher "cookie" data it will be available the next time the browser is requesting content from the ad server and executes client side programming code due to that. For example if the ad server has determined to never deliver the content to that particular visitor's browser again and this information is stored as publisher "cookie" data, then the next time the content is requested the browser does not need to access the ad server for a decision again, since the publisher "cookie" data already has the relevant information.

To illustrate this mechanism consider example 2. Again the Javascript programming language is used here.

EXAMPLE 2

The publisher uses the following code inside a web page:
<SCRIPT>var alt_content="http://example-publisher.com/alt_contentjs" </SCRIPT>
<SCRIPT SRC="http://ad-server-PROXY.com/content.js"></SCRIPT>
Only a single type of response is returned:

```
Function Decision(what) {
    If (what=="show original") {
        ... /* Code for loading the original ad */ ...
    } else {
        document.write('<SCRIPT SRC="'+ alt_content +'">
        </SCR'+'IPT>');
    }
}
document.write('<SCRIPT SRC="http://ad-server-example.com/
decide.js"></SCR'+'IPT>');
```

The embedded script "decide.js" has 2 possible responses:

Response 1 (use original content):

Decision("show original")

Response 2 (use alternate):

Decision("alternate")

IV. High Availability Improvement for Method (B)

One issue of method (B) should be described in more detail. It relates to making content delivery highly available as well as the way content can be embedded into a web page using client side programming code. It was described for method (B) that client side decision-making might be desirable where the content is not delivered by the ad server directly. Content is sometimes served by other entities such as content serving networks, which, offer a highly reliable and redundant network of servers for serving content. Using such a network for content serving has many advantages as it increases the performance of serving the end user and adds redundancy to the serving process that makes the content delivery virtually failsafe. Due to these advantages, a $3^{rd}$ party content provider may want to serve its content through such a network. This would then make the implementation of method (A) impossible without compromising the redundancy gained through using the serving network, if the serving network does not dynamically make the decisions on what response to deliver on behalf of the ad server. If the location of the content or programming code would point to the ad server directly rather than the serving networks, the redundancy of that network would be compromised since a failure of the ad server would prevent the content from being delivered. Due to this, method (B) may be chosen over method (A). However, since also in method (B) programming code must be requested directly from the ad server to retrieve data, and therefore depends on the availability of the ad server, method (B) will in practice only be useful if it also offers a solution for the case that the ad server is temporarily unavailable.

This can be achieved with a timeout mechanism. The timeout would run while the content used for making the decision is being requested from the ad server. If the content is retrieved, the timeout is aborted. If the timeout runs out before the content is retrieved, the content loading is aborted and a default action is taken, such as loading and embedding the original content. This addition to method (B) offers a solution for limiting content delivery while using a serving network for content delivery.

To illustrate this the following modified version of example 2 shows how a timeout mechanism is added to the programming code that ensures that content is delivered even if the ad server is unavailable and a serving network is used.

EXAMPLE 3

The publisher uses the following code inside a web page:
<SCRIPT>var alt_content="http://example-publisher.com/alt_content.js" </SCRIPT>
<SCRIPT SRC="http://ad-server-PROXY.com/content.js"></SCRIPT>

Only a single type of response is returned:
done=false

```
Function Decision(what,action) {
    if (done) return;
    done=true;
    if (action=="abort") document.getElementById ("code").
    innerHTML="";
    If (what=="show original") {
        . . . /* Code for loading the original ad */ . . .
    } else {
        document.write('<SCRIPT SRC="'+ alt_content + '">
        </SCR'+'IPT>');
    }
}
setTimeout('Decision("show original","abort")', 500)
document.write('<DIV ID="code">');
document.write('<SCRIPT SRC="http://ad-server-example.com/decide.js"></SCR'+'IPT>');
document.write('</DIV>');
```

In the above example the timeout would allow the request to the ad server 500 milliseconds (0.5 seconds) to perform its task. After that time the content loading is aborted and default action is taken.

Another point to mention here is related to the way content can be embedded into a web page by using client-side programming code, such as Javascript. Looking at the history of browser technology the first common method was by using the programming statement "document.write" or "document.writeln". However this method cannot be used by code that is triggered by a "setTimeout" command or any other mechanism that executes code outside of the main execution thread. Newer browsers allow other methods of embedding content, which do not have this problem. But some older browser versions, which are sill in use only offer "document.write". For those browsers the timeout mechanism could not work, as any action by the timeout would not be able to embed general content into the web page. However if the content in questions has a known format, for example the content is an image, it is possible to first create similar content and later modify properties of that content, such as the image location (URL) through the timeout mechanism and obtain the desired result.

What is claimed is:

1. A method for limiting the delivery of content in a communications network environment comprising:
   establishing the assumed frequencies with which subsets of a set of content elements have been viewed by individual users of the communications network environment;
   evaluating the assumed frequencies with regard to predetermined frequency targets;
   determining, from within a client computer of an individual user, whether or not the evaluation of the assumed frequencies warrants the delivery of alternate content;
   providing a mechanism for the delivery of the alternate content; and
   updating data stored in a communications network storage device to aid in determinations of whether the alternate content should be shown, wherein the data used in determining whether or not the frequency evaluation of the assumed frequencies with regard to predetermined frequency targets warrants the delivery of alternate content is stored in a web browser of the client computer.

2. The method of claim 1, wherein the mechanism for the delivery of the alternate content enables publishers in the communications network environment to provide the alternate content.

3. The method of claim 2, wherein a publisher within the communications network environment is provided with a mechanism to provide the alternate content that is independent of other publishers within the communications network environment.

4. The method of claim 1, wherein the data used in determining whether or not the frequency evaluation of the assumed frequencies with regard to predetermined frequency targets warrants the delivery of alternate content is stored on a communications network storage device other than in a web browser of the client computer.

5. The method of claim 1, wherein an absence of available data for determining whether or not the frequency evaluation of the assumed frequencies with regard to predetermined frequency targets warrants the delivery of alternate content is interpreted in determining whether or not the delivery of alternate content is warranted.

6. The method of claim 2, wherein the alternate content is provided by a mechanism selected from the group consisting of:
   a. Defining a Uniform Resource Locator (URL) pointing to the location where the alternate content is intended to be retrieved from,
   b. Defining a Uniform Resource Locator (URL) pointing to programming code that is intended to be retrieved and executed with the purpose of causing the display of the alternate content,
   c. Defining the alternate content within a content container, such as a web page,
   d Defining programming code within the content container, such as a web page, that will cause the display of the alternate content, and
   e. Redirecting the browser to a location within the publisher's authority, which enables the publisher to return the alternate content in response.

7. The method of claim 1, wherein the delivery of the alternate content can be aborted and the subsets of the set of content elements can instead be delivered.

8. The method of claim 7, wherein the mechanism to abort the delivery of the alternate content is triggered from an event selected from the group consisting of:
   a. a time delay in the process of determining whether or not the frequency evaluation of the assumed frequencies with regard to predetermined frequency targets warrants the delivery of the alternate content,
   b. a time delay in the delivery of the alternate content,
   c. an error in the process of determining whether or not the frequency evaluation of the assumed frequencies with regard to predetermined frequency targets warrants the delivery of the alternate content, and
   d. an error in the delivery of the alternate content.

9. The method of claim 1, wherein the alternate content is not delivered.

10. The method of claim 1, wherein the content is an advertisement.

11. The method of claim 1, wherein the subset of the set of content elements is a proper subset of the set of content elements.

12. A method for limiting the delivery of content in a communications network environment comprising:
   establishing the assumed frequencies with which subsets of a set of content elements have been viewed by individual users of the communications network environment for subsets of a set of publishers;
   evaluating the assumed frequencies with regard to predetermined frequency targets;
   determining, from within a client computer of an individual user, whether or not the evaluation of the assumed frequencies warrants the delivery of alternate content;
   providing a mechanism for the delivery of the alternate content; and
   updating data stored in a communications network storage device to aid in determinations of whether the alternate content should be shown, wherein the data used in determining whether or not the frequency evaluation of the assumed frequencies with regard to predetermined frequency targets warrants the delivery of alternate content is stored on a communications network storage device other than in a web browser of the client computer.

13. The method of claim 12, wherein the determination of whether the delivery of the alternate content is warranted for the individual user is based on the evaluation of the assumed frequencies with which particular subsets of a set of content elements have been viewed by the individual user within a particular subset of the set of publishers.

14. The method of claim 12, wherein the mechanism for the delivery of the alternate content enables publishers in the communications network environment to provide the alternate content.

15. The method of claim 14, wherein any given publisher within the communication network environment is provided with a mechanism to provide the alternate content that is independent of other publishers within the communications network environment.

16. The method of claim 12, where an absence of available data for determining whether or not the frequency evaluation of the assumed frequencies with regard to predetermined frequency targets warrants the delivery of alternate content is interpreted in determining whether or not the delivery of alternate content is warranted.

17. The method of claim 12, wherein the alternate content is provided by a mechanism in selected from the group consisting of:
   a. Defining a Uniform Resource Locator (URL) pointing to the location where the alternate content is intended to be retrieved from,
   b, Defining a Uniform Resource Locator (URL) pointing to programming code that is intended to be retrieved and executed with the purpose of causing the display of the alternate content,
   c. Defining the alternate content within a content container, such as a web page,
   d. Defining programming code within the content container, such as a web page, that will cause the display of the alternate content, and
   e. Redirecting the browser to a location within the publisher's authority, which enables the publisher to return the alternate content in response.

18. The method of claim 12, wherein the delivery of the alternate content can be aborted and the subsets of the set of content elements can instead be delivered.

19. The method of claim 18, wherein the mechanism to abort the delivery of the alternate content is triggered from an event selected from the group consisting of:
   a. a time delay in the process of determining whether or not the frequency evaluation of the assumed frequencies with regard to predetermined frequency targets warrants the delivery of the alternate content,
   b. a time delay in the delivery of the alternate content,
   c. an error in the process of determining whether or not the frequency evaluation of the assumed frequencies with regard to predetermined frequency targets warrants the delivery of the alternate content, and
   d. an error in the delivery of the alternate content.

20. The method of claim 12, wherein the alternate content is not delivered.

21. The method of claim 12, wherein the content is an advertisement.

22. The method of claim 12, wherein the subset of the set of content elements is a proper subset of the set of content elements.

23. The method of claim 12, wherein the subset of a set of publishers is a proper subset of the set of publishers.

24. A method for limiting the delivery of content in a communications network environment, the method comprising:
   establishing assumed frequencies with which advertising content has been viewed by individual users of the communications network environment for subsets of a set of publishers;
   evaluating the assumed frequencies with regard to predetermined frequency targets;
   enabling the determination of whether or not the evaluation of the assumed frequencies warrants the delivery of alternate advertising content, wherein enabling the determination is made from within a client computer of an individual user;
   providing a mechanism to the publishers for the delivery of the alternate advertising content, wherein at least one of the publishers is provided a mechanism to provide the alternate advertising content that is independent of the other publishers; and
   updating data stored in a communications network storage device to aid in determinations of whether the alternate advertising content should be shown, wherein the data used in determining whether or not the frequency evaluation of the assumed frequencies with regard to predetermined frequency targets warrants the delivery of alternate advertising content is stored in at least one of a communications network storage device and a web browser of the client computer.

25. The method of claim 24, wherein an absence of available data for determining whether or not the frequency evaluation of the assumed frequencies with regard to predetermined frequency targets warrants the delivery of alternate advertising content is interpreted in determining whether or not the delivery of alternate advertising content is warranted.

26. The method of claim 24, wherein the alternate advertising content is provided by a mechanism selected from the group consisting of:
   a. Defining a Uniform Resource Locator (URL) pointing to the location where the alternate advertising content is intended to be retrieved from, b. Defining a Uniform Resource Locator (URL) pointing to programming code that is intended to be retrieved and executed with the purpose of causing the display of the alternate advertising content, c. Defining the alternate advertising content within a content container, such as a web page, d Defining programming code within the content container, such as a web page, that will cause the display of the alternate advertising content, and e. Redirecting the browser to a location within the authority of the at least one publisher, which redirection enables the at least one publisher to return the alternate advertising content in response.

27. The method of claim 24, wherein the delivery of the alternate advertising content can be aborted and the advertising content can instead be delivered.

28. The method of claim 27, wherein the mechanism to abort the delivery of the alternate advertising content is triggered from an event selected from the group consisting of:

a. a time delay in the process of determining whether or not the frequency evaluation of the assumed frequencies with regard to predetermined frequency targets warrants the delivery of the alternate advertising content, b. a time delay in the delivery of the alternate advertising content, c. an error in the process of determining whether or not the frequency evaluation of the assumed frequencies with regard to predetermined frequency targets warrants the delivery of the alternate advertising content, and d. an error in the delivery of the alternate advertising content.

29. A method for limiting the delivery of content in a communications network environment, the method comprising:

establishing assumed frequencies with which advertising content has been viewed by individual users of the communications network environment for subsets of a set of publishers;

evaluating the assumed frequencies with regard to predetermined frequency targets;

enabling the determination of whether or not the evaluation of the assumed frequencies warrants the delivery of alternate advertising content, wherein enabling the determination is made from within a client computer of an individual user;

providing a mechanism for the delivery of the alternate advertising content that enables publishers in the communications network environment to provide the alternate content; and updating data stored in a communications network storage device to aid in determinations of whether the alternate content should be shown, wherein the data used in determining whether or not the frequency evaluation of the assumed frequencies with regard to predetermined frequency targets warrants the delivery of alternate advertising content is stored in at least one of a communications network storage device and a web browser of the client computer;

wherein an absence of available data for determining whether or not the frequency evaluation of the assumed frequencies with regard to predetermined frequency targets warrants the delivery of alternate advertising content is interpreted in determining whether or not the delivery of alternate advertising content is warranted.

30. The method of claim 29, wherein enabling the determination of whether the delivery of the alternate advertising content is warranted for the individual user is based on the evaluation of the assumed frequencies with which particular subsets of the advertising content has been viewed by the individual user within a particular subset of the set of publishers.

31. The method of claim 29, wherein at least one of the publishers is provided a mechanism to provide the alternate content that is independent of the other publishers.

32. The method of claim 31, wherein the alternate advertising content is provided by a mechanism selected from the group consisting of:

a. Defining a Uniform Resource Locator (URL) pointing to the location where the alternate advertising content is intended to be retrieved from, b. Defining a Uniform Resource Locator (URL) pointing to programming code that is intended to be retrieved and executed with the purpose of causing the display of the alternate advertising content, c. Defining the alternate advertising content within a content container, such as a web page, d Defining programming code within the content container, such as a web page, that will cause the display of the alternate advertising content, and e. Redirecting the browser to a location within the authority of the at least one publisher, which redirection enables the at least one publisher to return the alternate advertising content in response.

33. The method of claim 29, wherein the delivery of the alternate advertising content can be aborted and the advertising content can instead be delivered.

34. The method of claim 33, wherein the mechanism to abort the delivery of the alternate advertising content is triggered from an event selected from the group consisting of:

a. a time delay in the process of determining whether or not the frequency evaluation of the assumed frequencies with regard to predetermined frequency targets warrants the delivery of the alternate advertising content, b. a time delay in the delivery of the alternate advertising content, c. an error in the process of determining whether or not the frequency evaluation of the assumed frequencies with regard to predetermined frequency targets warrants the delivery of the alternate advertising content, and d. an error in the delivery of the alternate advertising content.

* * * * *